Sept. 29, 1970           W. E. HUMPHREY           3,531,176
MULTIPLE TELESCOPE STABILIZING OPTICAL SYSTEM
Filed Sept. 4, 1968                                         4 Sheets-Sheet 1
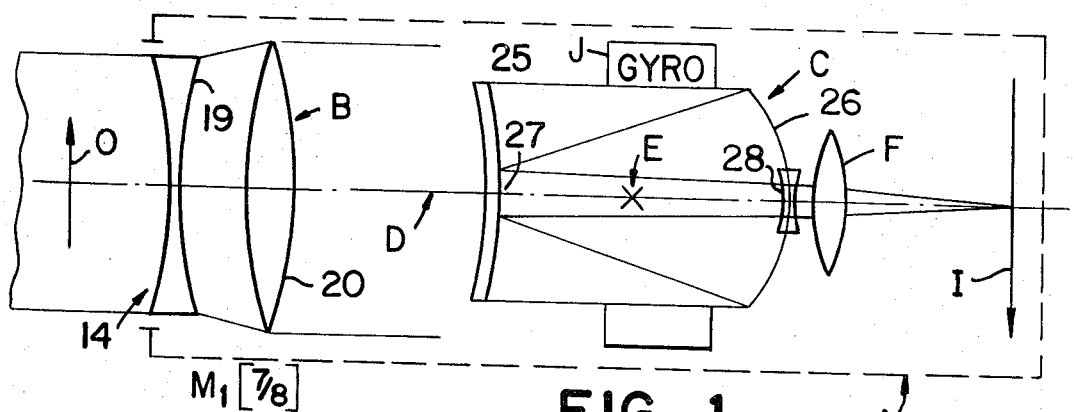
FIG_1
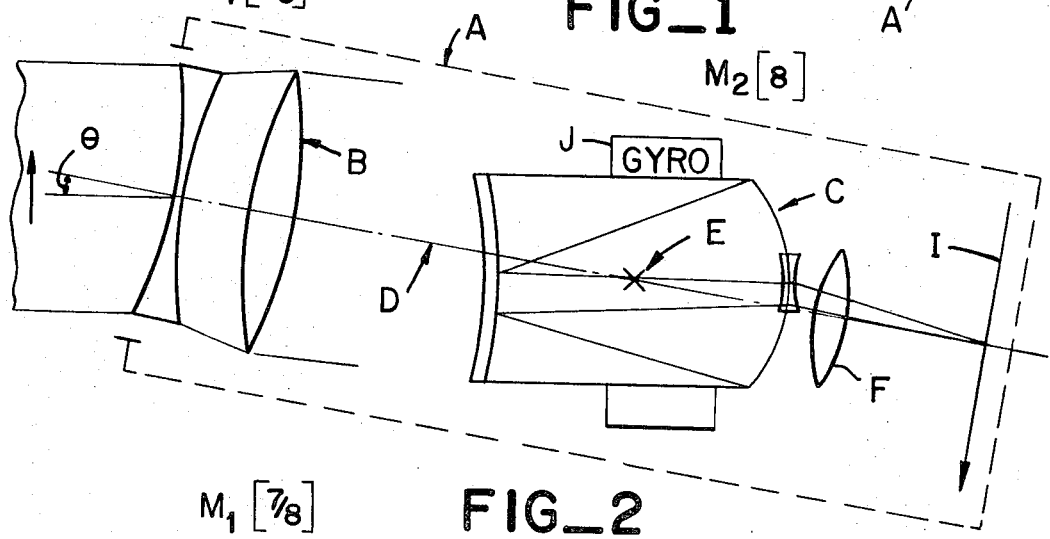
FIG_2
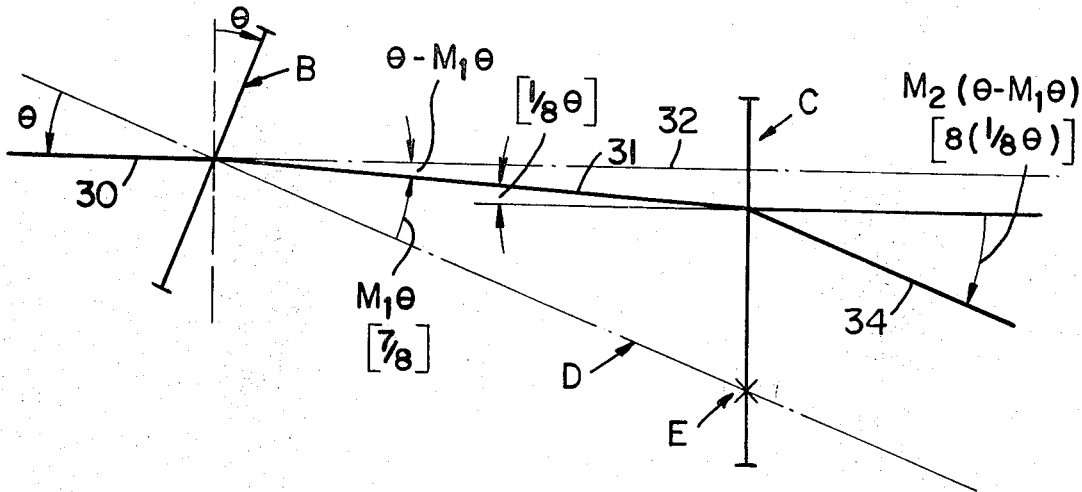
FIG_3
INVENTOR.
WILLIAM E. HUMPHREY
BY
*Townsend and Townsend*
ATTORNEYS

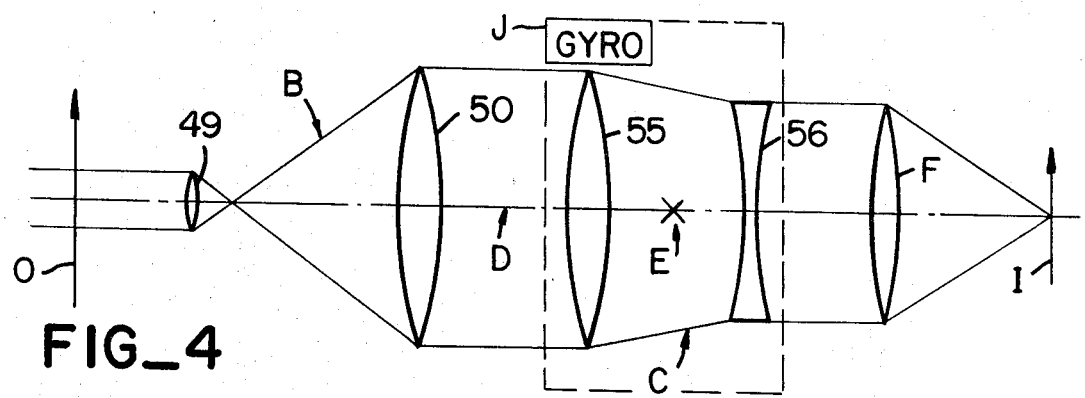
FIG_4
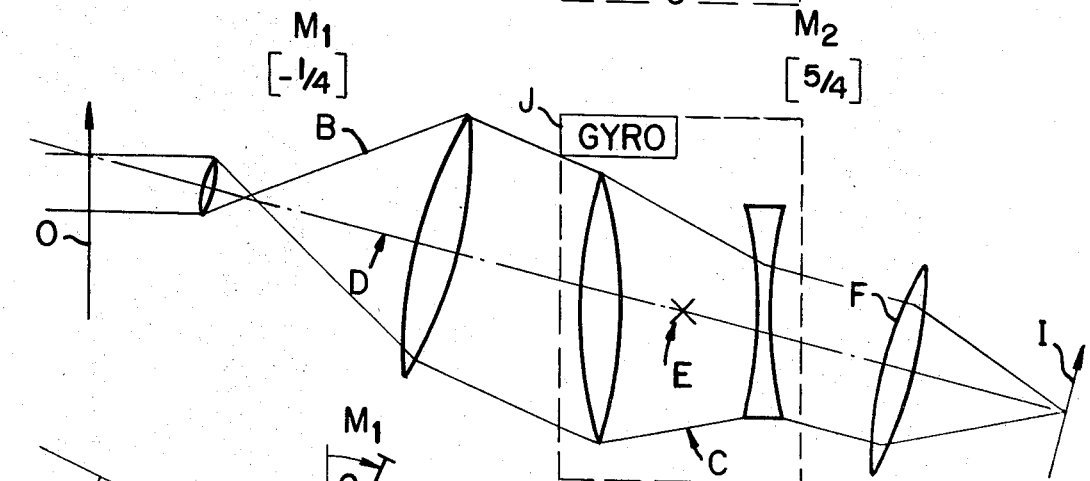
FIG_5
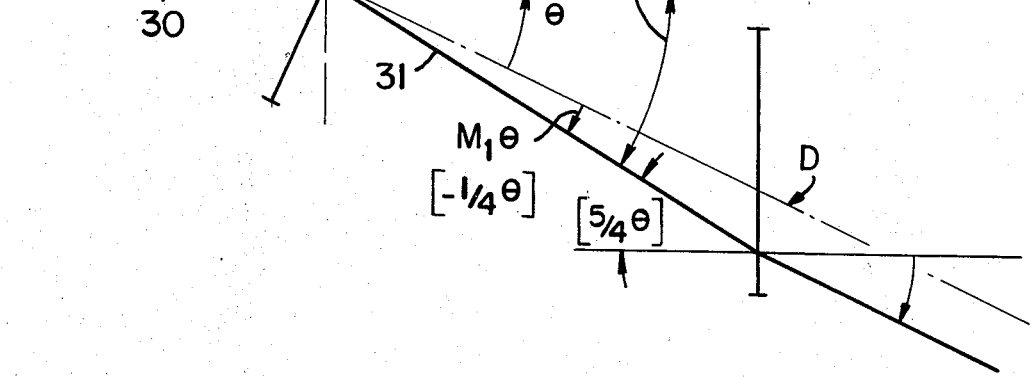
FIG_6

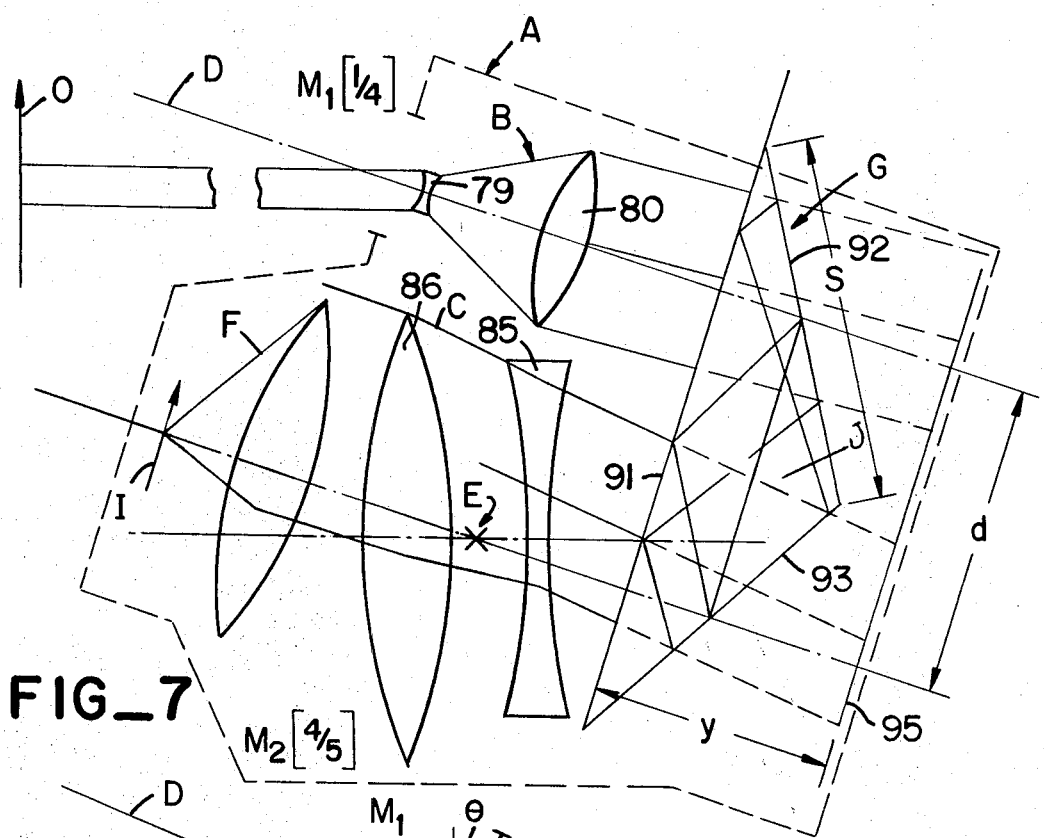
FIG_7
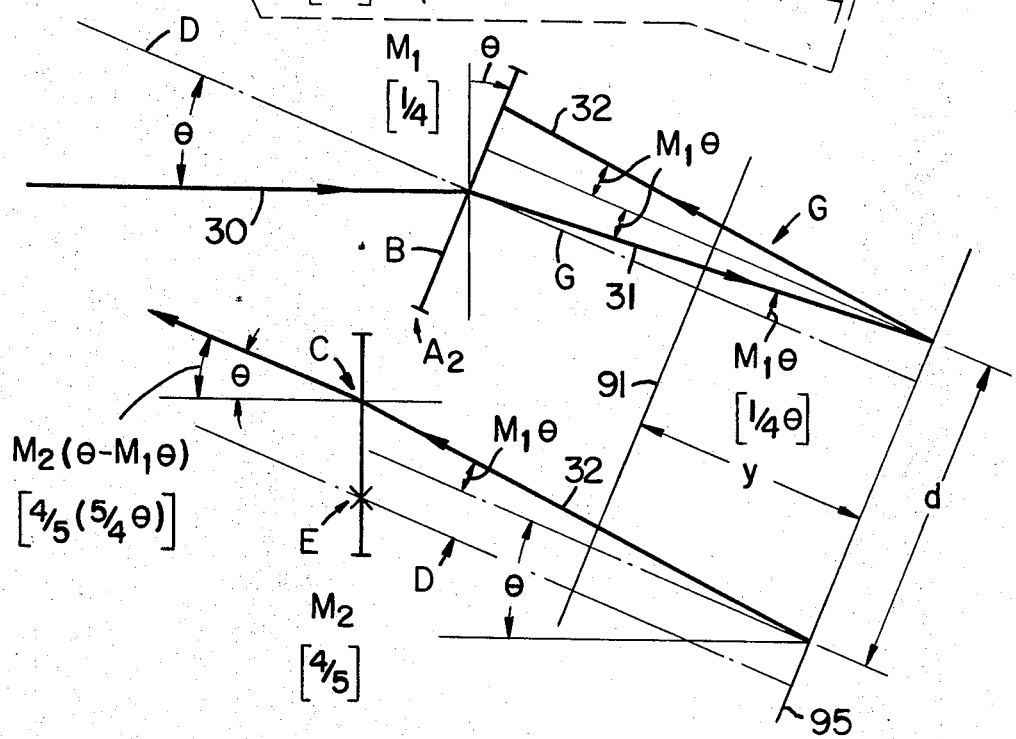
FIG_8

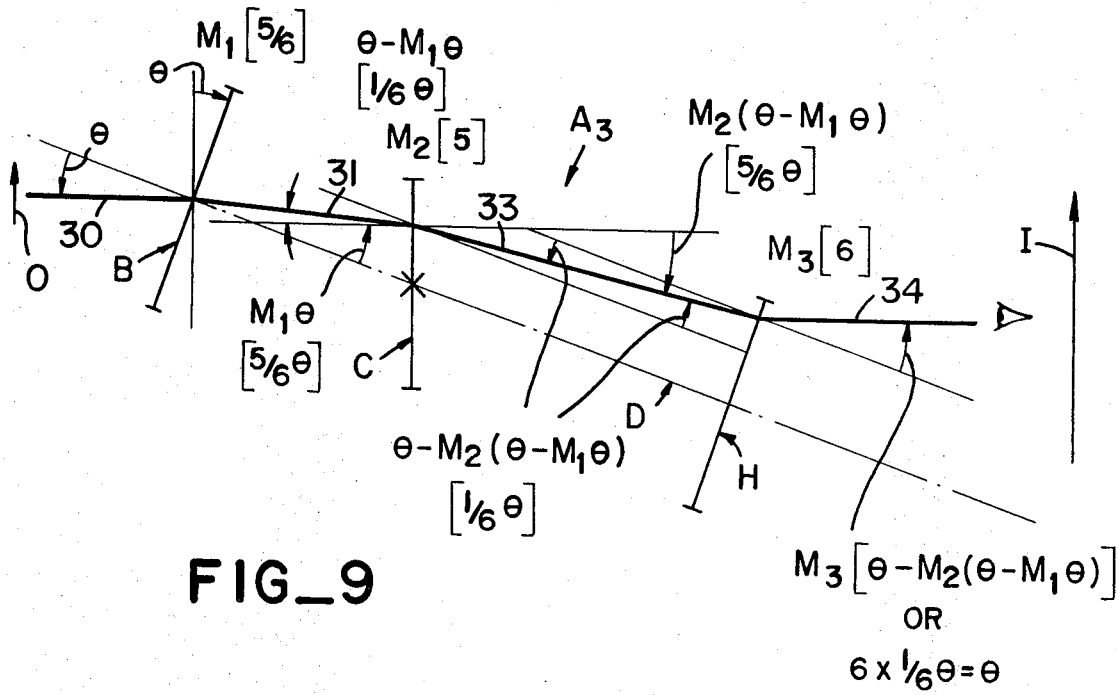
FIG_9
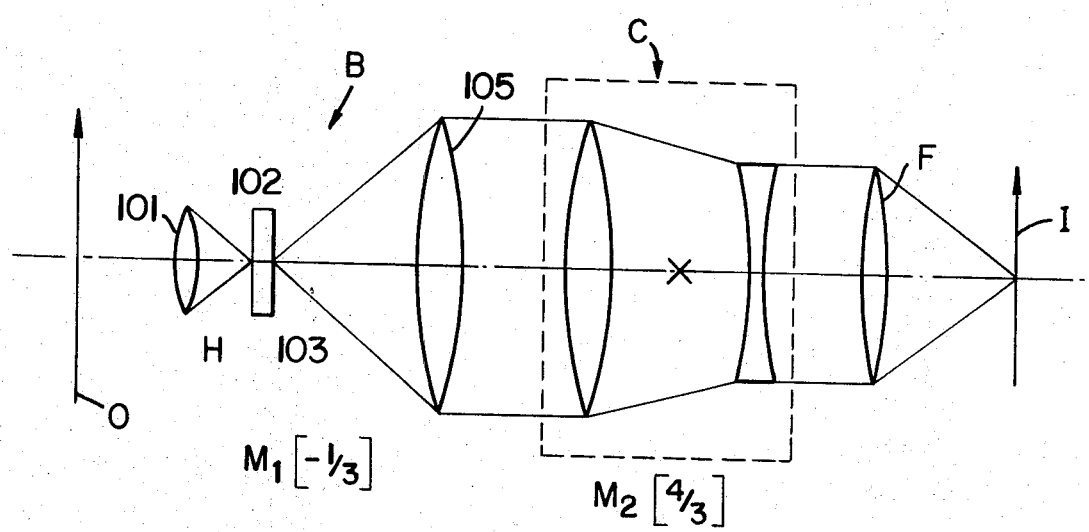
FIG_10
INVENTOR.
WILLIAM E. HUMPHREY
BY
Townsend and Townsend
ATTORNEYS United States Patent Office 3,531,176
Patented Sept. 29, 1970

3,531,176
MULTIPLE TELESCOPE STABILIZING OPTICAL SYSTEM
William E. Humphrey, Oakland, Calif., assignor to Optical Research and Development Corporation, Oakland, Calif., a corporation of California
Filed Sept. 4, 1968, Ser. No. 757,306
Int. Cl. G02b 23/00
U.S. Cl. 350—16                                    11 Claims

ABSTRACT OF THE DISCLOSURE

An optical stabilizing device comprising two optically aligned telescopes, the first of said telescopes having a magnification power of $M_1$ and the second telescope having a magnification power of $M_2$ adapted to receive light from the first telescope in which the second of said two telescopes is inertially stabilized and the magnification of said two telescopes is related by the formula $$\pm M_1 = \left(1 - \frac{1}{M_2}\right)$$

and also incorporating in one embodiment of said stabilizer the projection of an image display screen mounted within one of the two telescopes.

---

This invention relates to a new and improved optical train for stabilizing images processed therethrough.

The object of the present invention is to provide an image stabilizing optical train using a series of telescopes, which train receives light from a viewed object and emanates this light stabilized despite accidental motion or vibration imparted to the train or its housing. The invention is particularly applicable to the optics of cameras or telescopes mounted or held so as to have accidental motion imparted thereto.

In order to accomplish this result, the present invention provides an optical train having at least two telescopes mounted therealong. The first telescope of magnification $M_1$ is mounted with its optical axis fixed with respect to the axis of the train and moves responsive to the accidental motion imparted to the optical train. The second telescope of magnification $M_2$ is gimbal mounted relative to the axis of the optical train and maintains a constant angular orientation in space relative to the line of sight to an object viewed by the optical train. These first and second telescopes have their respective magnifications balanced so that the apparent motion of the object produced by accidental motion of the optical train is precisely compensated. This compensation is achieved by having magnifications $M_1$ and $M_2$ of the first and second telescopes respectively related by the equation:

$$\pm M_1 = 1 - \frac{1}{M_2}$$

An advantage of this invention is that the second telescope may be disposed directly behind the first telescope without any intervening optical element.

According to one aspect of this invention a reflecting and displacing optical element such as a prism may be disposed between the first telescope and the second telescope for substantially retrodirecting the stabilized light.

An additional feature of this invention is that the optics of the first fixed telescope and the second gimbal mounted telescope may be modified by insertion of a third fixed telescope to optically stabilize light emanating from the optical train for direct eye viewing. According to this aspect of the invention, the third telescope fixed relative to the axis of the optical train, is mounted to receive light emanating from the second telescope. This telescope emanates such light stabilized for optical or direct eye viewing when the first, second and third telescopes have their respective magnification related by the equation:

$$\pm M_1 = \left(1 - \frac{1}{M_2} + \frac{1}{M_2 M_3}\right)$$

In another aspect of this invention, an image display plate is mounted within preferably the first telescope. This display plate can be adapted to vary the intensity or focus of light received from a viewed object, change the wavelength of light received from an object, or change the size of an image projected by light received from an object.

Other objects, features and advantages of the present invention will be more apparent after referring to the following specification and attached drawings in which:

FIG. 1 is a schematic of an optical stabilizer utilizing a fixed erect image telescope and a gimbal mounted reflection telescope stabilized against accidental motion;

FIG. 2 is a schematic of the stabilizer of FIG. 1 angularly displaced by accidental motion;

FIG. 3 is an optical path schematic of FIG. 2;

FIG. 4 is a schematic of a wide angle optical stabilizer utilizing a fixed inverting telescope of negative magnification and a gimbal mounted erect image telescope stabilized against accidental angular motion;

FIG. 5 is a schematic of the optical stabilizer of FIG. 4 angularly displaced by accidental motion;

FIG. 6 is an optical path schematic of FIG. 5;

FIG. 7 is an optical stabilizer for producing a retrodirected camera stabilized image, the stabilizer here shown deflected by accidental motion;

FIG. 8 is an optical path schematic of FIG. 7;

FIG. 9 is an optical path schematic of a stabilizer suitable for direct eye stabilized viewing; and, FIG. 10 is a schematic of an optical stabilizer utilizing an image display device within the first telescope.

With reference to FIGS. 1 and 2, an optical stabilizer is shown including a casing A having attached therein adjoining a light receiving opening fixed telescope B concentrically mounted on optic axis D. Behind fixed telescope B there is mounted a stabilized telescope C pivoted on gimbals E also located on optic axis D. Following telescope C and affixed to casing A there is an objective lens F which serves to focus inverted image I of object O within casing A.

Casing A is a light impervious body or case illustrated in FIG. 1 in broken lines. This body encloses the stabilizer from sources of interfering light, provides a common member to which the elements of the stabilizer can be affixed, and has at one end light receiving opening 14.

Fixed telescope B, immediate opening 14, is here shown comprising a reversed erect image telescope of the Galilean variety. Telescope B is mounted with its optical axis on axis D and includes biconcave lens 19 and biconvex lens 20. As rigidly mounted, telescope B is angularly deflected by accidental motion imparted to casing A.

Stabilized telescope C is an erect image double reflecting telescope having positive magnification. Telescope C is there shown having a negative meniscus lens 25 which deflects light to reflecting mirror 26. Mirror 26 reflects and substantially retrodirects this light onto a silvered reflecting surface 27 mounted to the rear of lens 25. Thereafter light is reflected and substantially retrodirected for the second time from silvered surface 27 through biconcave lens 28 to emanate from stabilized telescope C.

Stabilized telescope C is pivotally mounted to casing A at gimbals E. Gimbals E fasten telescope C to a fixed position or point near optical axis D and permit stabilized telescope C to pivot about two mutually perpendicular axes each normal to optical axis D. Gimbals E function in cooperation with gyro J to permit stabilized telescope C to maintain a constant angular alignment even though changes in such alignment occur to casing A through accidental motion.

Regarding this constant angular alignment of telescope C, gyro J and gimbals E are designed in accordance with principles well known to effect stabilization against small angular vibrations of relatively high frequency. Such vibrations include the tremulation of a human hand holding the stabilizer, mechanical vibrations imparted to the stabilizer, by a vibrating platform such as a ship or plane, or any other varied motion which would displace the image I when the stabilizer is used. Additionally, gimbals E and gyro J can be arranged to pan with the stabilizer when the optical instrument is angularly moved at a constant and sustained rate to scan a scene or follow objects changing in bearing with respect to the viewing point.

The optical path schematic of FIG. 3 illustrates fixed telescope B and stabilized telescope C as solid lines in a stabilizer having an accidental motion deflection of its axis D an angle $\theta$ from a received ray 30 emanating from object O (not shown). In order to produce an image I stabilized against accidental motion, stabilized light ray 34 must exit telescope C parallel to optic axis D of the stabilizer. For purposes of this disclosure, the parallel relation to axis D of an emanating light ray is achieved by conforming the magnifications $M_1$ of any fixed telescope B and $M_2$ of any stabilized telescope C to the general formula:

$$\pm M_1 = 1 - \frac{1}{M_2}$$

With reference to FIG. 3, the specific derivation of that portion of the foregoing formula applicable to the stabilizer of FIGS. 1–3 can be understood. Due to imparted accidental motion, received ray 30 from object O (not shown) is incident on telescope B at an angle $\theta$, with respect to axis D. In passing through fixed telescope B, ray 30 is deflected an angle equal to the angle of incidence with respect to axis D multiplied by the magnification of telescope B. This deflection is mathematically expressed as:

$$M_1 \theta$$

Emanating from telescope B as deflected ray 31 the light from object O is incident upon stabilized telescope C at an angle equal to its deflection from the original line of sight 32 to object O. This angle of incidence can be expressed by subtracting the deflection ray 31 in fixed telescope B from the angular displacement $\theta$ of the stabilizer:

$$(\theta - M_1 \theta)$$

To emanate a stabilized light ray 34, stabilized telescope C must angularly deviate deflected ray 31 to a parallel relation to optical axis D. As optical axis D has been moved an angle $\theta$ with respect to the original line of sight 32, the desired orientation of deflected ray 31 through telescope C can be equated to this angle $\theta$:

$$\theta = M_2(\theta - M_1 \theta)$$

This later formula may be readily solved for $M_1$ to obtain the specific stabilization formula applicable to the stabilizer of FIGS. 1–3:

$$+ M_1 = 1 - \frac{1}{M_2}$$

FIGS. 1 through 3 include specific examples of fixed telescope B having a positive magnification of 7/8 and stabilized telescope C having a positive magnification of 8. This combination of telescopes produces stabilizer optics having a magnification of 7 power at objective lens F and provides a convenient mathematical example. In substituting other magnification values within the derived stabilization formula, it will become apparent that relatively high or large overall magnifications can be obtained by permitting the magnification $M_1$ of fixed telescope B to approach a positive value of one (+1).

It is necessary that fixed telescope B angularly deviate deflected light E at some small angle from line of sight 32. If there is no deviation (as when the magnification $M_1$ of fixed telescope B is a positive value of one (+1)), no stabilization will be achieved.

The stabilizer of this invention compensates only for angular deviation of the optical axis D with respect to the viewed object O. If casing A is moved in other than a pitch or yaw relation, no stabilization will occur nor is it ordinarily desirable.

With reference to FIGS. 4 through 6, an alternate embodiment of the stabilizer is illustrated particularly suited for stabilizing wide angle camera images. This stabilizer has a fixed and reversed inverting telescope B of negative magnification combined with a stabilized erect image telescope C (enclosed within broken lines) of positive magnification, casing A being omitted for purposes of clarity. Inverting image telescope B is of the Keplerian variety and comprises a first biconvex lens 49 and a second biconvex lens 50. Stabilized erect image telescope C is of the Galilean variety and includes a first biconvex lens 55 and a second biconcave lens 56. Similar to the stabilizer previously described, fixed telescope B has its axis on optical axis D and stabilized telescope C is mounted on gimbals E also near axis D.

In the angularly deviated position, illustrated in FIGS. 5 and 6, it is seen the deflection of light interior of the illustrated stabilizer is analogous to the stabilizer of FIGS. 1 through 3 previously illustrated. Received ray 30 impinges upon fixed telescope B and is deflected clockwise below optical axis D due to the negative magnification $M_1$ of telescope B. Emanating as deflected ray 31, the light passes through stabilized telescope C and is deflected therein so as to emanate parallel optical axis D. As is apparent from FIGS. 4 and 5, in traversing the subject stabilizer, the light from an object O when focused through an objective lens F will produce an erect and reduced image I. The stabilization formulae for this stabilizer is precisely identical to that specific formulae derived for FIGS. 1 through 3.

A mathematical example of stabilizer optics having an overall negative magnification 5/16 power at objective lens F is illustrated in FIGS. 4 through 6. Fixed telescope B has a negative magnification of 1/4 while stabilized telescope C has a positive magnification of 5/4 power.

With reference to FIGS. 7 and 8, an additional stabilizer is illustrated using reflecting surfaces between fixed telescope B and stabilized telescope C. This stabilizer is shown contained within a casing A and includes a reversed erect image fixed telescope B of the Galilean variety affixed adjoining light receiving opening 68. Telescope B has its optic axis coincident with the optic axis D of the stabilizer and includes biconcave lens 79 followed by biconvex lens 80.

Light passing through fixed telescope B impinges upon a reflecting and displacing prism G. This prism has the shape of an isosceles triangle with the angles between the sides and base thereof here shown as 30°. Deflected ray 31 emanating from fixed telescope B enters into prism G at front surface 91 impinges upon first rear reflecting surface 92. At surface 92 the light is internally reflected onto the reverse side of front surface 91. On the reverse side of surface 91, the light receives a second reflection which in turn deflects the light onto the third reflecting surface 93. After becoming incident upon the third reflecting surface, the light rebounds therefrom and exits prism G through surface 91. so as to be incident upon fixed telescope C.

Prism J as specifically illustrated in FIG. 7 is only exemplary of various reflecting and displacing elements which could be used. Other alternative elements are illustrated in copending application Ser. No. 592,369, filed Nov. 7, 1966 and entitled "Accidental Motion Compensation by Triple Reflection."

As applied to the specific examples of FIGS. 7 and 8, prism G has two main functions which can be conveniently described using an imaginary reflecting surface 95 located a distance Y behind surface 91 of prism G. First, the prism displaces the path of reflected light to a distance $d$ from its point of impact on imaginary surface 95. Secondly, for every angle $\theta$ at which light is inclined with respect to surface 91 of prism G, reflected light emanating from the prism will be angularly deviated $2\theta$ with respect to the incident ray. As angularly deviating this light, prism G serves as an effective reflecting surface along the optical path between fixed telescope B and stabilized telescope C.

With reference to the optical diagram of FIG. 8 it can be demonstrated that the stabilization of light through the illustrated stabilizer conforms to the formula:

$$-M_1 = \left(1 - \frac{1}{M_2}\right)$$

Received light ray 30 from object O (not shown) passes through fixed telescope B and is deviated an angle $M_1\theta$. Ray 30 emanates from telescope B as deflected ray 31 onto reflecting and displacing prism G. Prism G, mounted with its front surface 91 normal to optical axes D through fixed telescope B acts as a displacing and reflecting surface 95 located a distance Y behind front surface 91. As a displacing surface, light from prism G will emanate from a point on imaginary surface 95 displaced a distance $d$ from its original point of incidence on this imaginary surface. As a reflecting device, prism G will emanate ray 32 from its displaced location on surface 95 an angle equal and opposite to the angle of incidence of ray 31 on imaginary surface 95. Expressed mathematically the angle of the emanating deflected ray 32 with respect to received ray 30 is:

$$\theta + M_1\theta$$

Thereafter, deflected light 32 will be processed by stabilized telescope C to emanate therefrom parallel to the original optic axis D. Expressing this relation in mathematical terms gives:

$$M_2(\theta + M_1\theta) = \theta$$

When solved for $M_1$, the above equation will be found to conform to the previously referenced formula:

$$-M_1 = 1 - \frac{1}{M_2}$$

This equation differs from the mathematical relation derived for FIGS. 1 through 6 in that it is the negative of the solution for $M_1$ previously obtained. This negative is a direct function of the properties of prism G in reflecting deflected ray 31.

Regarding the reflection properties of prism G, the above derived equation will be true where the reflecting device includes an effective reflecting surface and follows the Law of Reflection angularly emanating light an angle $2\theta$ for every incident angle $\theta$. Reflecting devices are known which will emanate light in parallel relation to the incident ray. These devices will not effect stabilization in a device of the class illustrated in FIG. 7.

FIGS. 1 through 8 have thus far illustrated stabilizers wherein light from an object O leaves or emanates from the stabilizer parallel to the optic axis D so to produce a camera stabilized image. Optical viewing devices, such as telescopes and binoculars, require that light emanating from the stabilizer leave parallel to the incoming light rays. A full explanation of this difference in stabilization is set forth in copending application Ser. No. 575,624 filed in the U.S. Patent Office on Sept. 1, 1966 and entitled "Optical Stabilization by Reflecting Means."

FIG. 9 is an optical path diagram of a stabilizer wherein light is stabilized for optical viewing. The illustrated stabilizer includes two fixed telescopes B and H with a stabilized telescope C therebetween. Telescopes B, C and H are all afocal instruments here shown having positive magnifications $M_1$ for telescope B, $M_2$ for telescope C and $M_3$ for telescope H. An optically stabilized image 1 is achieved by conforming the magnifications of the respective telescopes to the formula:

$$\pm M_1 = 1 - \frac{1}{M_2} + \frac{1}{M_2 M_3}$$

FIG. 9 is drawn with the assumption that accidental motion has angularly deviated the case by an angle $\theta$. Received light ray 30 is incident upon fixed telescope B and emanates therefrom at an angle $M_1\theta$ with respect to the case axis. Emanating from fixed telescope B as first deflected ray 31, the light is then incident upon stabilized telescope C at an angle deflected from the path of ray 30 mathematically expressed as:

$$\theta - M_1\theta$$

This deflected ray 31 when incident upon stabilized telescope C is deflected therein to emanate therefrom at an angle algebraically described as:

$$M_2(\theta - M_1\theta)$$

On emanating from stabilized telescope C as second deflected ray 33, the light will be incident upon second fixed telescope H at an angle inclined with respect to optical axis D, which angle may be expressed:

$$\theta - M_2(\theta - M_1\theta)$$

In emanating from second fixed telescope H, stabilized ray 34 must be parallel to received ray 30. To achieve this parallel relation, stabilized ray 30 must be deflected an angle $\theta$ counterclockwise from optical axis D, which deflection gives the following relation:

$$M_3(\theta - M_2(\theta - M_1\theta)) = \theta$$

By solving the above relation for $M_1$, the previously set forth optical stabilization formula may be obtained.

Utilizing a specific mathematical example, if fixed telescope B has a magnification $M_1$ of 5/6, stabilized telescope C a magnification $M_2$ of 5 and second fixed telescope H a magnification $M_3$ of 6, a 25 power optically stabilized image can be attained.

It will be understood that in all previous examples, telescopes of varied configurations and lens combinations could be substituted for those telescopes specifically illustrated. These substituted telescopes need only have magnifications within the limitations of the formulae set forth and further must receive and transmit collimated light.

FIG. 10 illustrates schematically such a substitution including an optical stabilizer utilizing an image display plate within fixed telescope B. This stabilizer has fixed telescope B with a magnification $M_1$ equal to minus 1/3 and stabilized telescope C with $M_2$ equal to 4/3. By the insertion of image display plate H, the illustrated stabilizer is particularly suited for generating an altered and stabilized wide angle image.

Image display plate H, shown inserted within fixed telescope B, can be any optic device which receives an image at surface 102 and displays the image therethrough onto surface 103. Typically, such devices either increase the intensity or focus, change the wavelength, or change the size of the image projected on image receiving surface 102.

Incorporating image display plate H, fixed telescope B comprises a first focusing lens 101. Lens 101 receives light from an object O and focuses such light in a real and inverted image on image receiving surface 102 of image display plate H. Image display plate H will in turn process this image by transmitting an altered image directly therethrough onto surface 103. The image on surface 103, shown specifically in FIG. 11, will be inverted and emanate its light to lens 105. Lens 105 will receive the light of the image on surface 103 and invert and collimate this light so that the light emanating from telescope B will comprise collimated rays capable of being focused into an image of object O.

In operation, light emanating from object O is received and processed through focusing lens 101 to form an inverted real image on image receiving surface 102 of image display plate H. This inverted image will be transmitted through display plate H, typically in an altered form, and will be displayed on surface 103 as shown in FIG. 11. As displayed on surface 103, the light will emanate therefrom into collimating lens 105. These lenses will emit inverted and collimated rays of object O imparting to telescope B an overall magnification of $-1/3$ in this example.

Upon exiting telescope B, the light will be incident upon stabilized telescope C. In stabilized telescope C the incident inverted image will be magnified by a power of $4/3$. As telescope C is stabilized about gimbal D, accidental angular deviations of optical axis D of the illustrated stabilizer will be compensated in fixed telescope C in accordance with the principles previously set forth. Thereafter, the light within telescope C will emanate therefrom parallel to optic axis D and form a stabilized and erect wide angle image I when focused through objective lens F.

Upon further examination, it will become apparent that image display plate H could be located within many of the various telescopes of stabilizers illustrated herein. The specific insertion of plate H in FIG. 10 is shown within fixed telescope B as early as practicable in the optical train. This early location of plate H permits the real image focused on image receiving surface 102 to be without appreciable light loss and allows a lens of high light collecting power. Alternate locations of plate H will increase the number of optical elements through which light must pass which may have an adverse effect on the image intensity at image display plate H.

As used above and in the claims the term magnification of a telescope is defined as the ratio represented by the angle of an emergent light ray divided by the angle of the corresponding incident light ray, both angles being measured with respect to the axis of the telescope with positive angles measured in a counterclockwise sense and negative angles measured in a clockwise sense. Hence, positive magnification will correspond to incident and emergent rays tending to be directed toward the same side of the telescope axis, and negative magnification will correspond to rays tending toward opposite sides of the telescope axis.

It has been found that in practical application of this invention each of the following relationships between $M_1$ and $M_2$ will operate to obtain the stabilization as above indicated:

| $M_1$ | $M_2$ |
| --- | --- |
| .96 | 25 |
| 1/4 | 4/3 |
| −1/4 | 3/5 |
| −3 | 1/4 |
| 5 | −1/4 |
| 1.04 | −25 |

(Minus sign indicates inverting optics.)

What is claimed is:

1. An optical train for emanating light of a viewed object which light is stabilized against accidental angular deviation of the optical train axis, said system comprising: a first telescope of magnification $M_1$ mounted with its optical axis fixed in alignment with respect to said train axis, said first telescope disposed to receive light emanating from said viewing object; a second telescope of magnification $M_2$ gimbal mounted relative to said train axis, stabilizing means for maintaining constant angular orientation of said second telescope axis relative to the line of sight to said viewed object, said second telescope disposed to receive light from said first telescope; the respective magnifications of said first and second telescopes being related by the equation:

$$\pm M_1 = \left(1 - \frac{1}{M_2}\right)$$

2. An optical train according to claim 1 and wherein said first telscope emanates light directly to said second telescope and said magnifications are related by the equation:

$$M_1 = \left(1 - \frac{1}{M_2}\right)$$

3. An optical train according to claim 1 and wherein means for reflecting light at an angle equal and opposite to the angle of incidence of the light on said reflecting means is disposed between said telescopes and the respective magnification of said telescopes is related by the equation:

$$-M_1 = 1 - \frac{1}{M_2}$$

4. An optical train according to claim 1 and including: a third telescope of magnification $M_3$ mounted with said optical axis of said third telescope fixed with respect to said train axis, said third telescope disposed to receive light emanating from said second telescope; the respective magnifications of said telescope being related by the equation:

$$\pm M_1 = \left(1 - \frac{1}{M_2} + \frac{1}{M_2 M_3}\right)$$

5. An optical train according to claim 1 and wherein the optics of one of said telescopes includes an image display plate.

6. An optical train according to claim 1 and wherein the optics of said first telescope includes an image display plate.

7. An optical train according to claim 1 and wherein said stabilizing means comprises a gyro connected to said second telescope.

8. In combination a housing having a light receiving opening therein; a first telescope fixed to said housing for receiving light from said housing opening; a second telescope gimbal mounted relative to said housing for maintaining constant angular alignment in space against accidental deviation in angular alignment imparted to said housing; said first and second telescopes having their respective magnifications $M_1$ and $M_2$ related by the equation:

$$\pm M_1 = \left(1 - \frac{1}{M_2}\right)$$

whereby light leaving said second telescope is substantially parallel to the optical axis of said first telescope.

9. The combination according to claim 8 and wherein means for focusing collimated light on an image plane is affixed to said housing for receiving light emanating from said second telescope.

10. A combination according to claim 8 and wherein means for reflecting light at an angle equal and opposite to the angle of incidence of the light on said reflecting means is mounted between said first and second telescope and said first and second telescopes have their respective magnifications $M_1$ and $M_2$ related by the equation:

$$-M_1 = 1 - \frac{1}{M_2}$$

11. A combination according to claim 10 and wherein said reflecting means includes means for displacing the reflected ray with respect to the incident ray.

References Cited

UNITED STATES PATENTS

| | | | |
|---|---|---|---|
| 2,389,142 | 11/1945 | Esval et al. | 356—149 |
| 2,741,940 | 4/1956 | Drodofsky. | |
| 2,959,088 | 11/1960 | Rantsch | 350—16 XR |
| 3,377,910 | 4/1968 | Drodofsky | 350—16 XR |

FOREIGN PATENTS

| | | |
|---|---|---|
| 146,960 | 3/1962 | U.S.S.R. |
| 212,048 | 4/1960 | Austria. |

PAUL R. GILLIAM, Primary Examiner

U.S. Cl. X.R.

95—12.5; 356—149